United States Patent [19]
Chavez, Jr.

[11] Patent Number: 6,101,396
[45] Date of Patent: Aug. 8, 2000

[54] DYNAMIC CALL COVERAGE PATHS BASED ON AUXILIARY UNITS

[75] Inventor: David L. Chavez, Jr., Thornton, Colo.

[73] Assignee: Lucent Technologies Inc., Murray Hill, N.J.

[21] Appl. No.: 09/182,337

[22] Filed: Oct. 29, 1998

[51] Int. Cl.⁷ .................................................... H04Q 7/20
[52] U.S. Cl. .......................... 455/519; 455/518; 455/556; 455/462; 455/463; 455/465
[58] Field of Search ...................... 379/211, 142, 379/230, 214; 455/519, 518, 556, 462, 463, 465

[56] References Cited

U.S. PATENT DOCUMENTS

| | | | |
|---|---|---|---|
| 4,436,962 | 3/1984 | Davis et al. | 379/211 |
| 5,392,346 | 2/1995 | Hassler et al. | 379/265 |
| 5,533,096 | 7/1996 | Bales | 379/58 |
| 5,745,561 | 4/1998 | Baker et al. | 379/210 |
| 5,862,482 | 1/1999 | Beesley | 455/434 |

OTHER PUBLICATIONS

U.S. Patent Application D.L. Chavez 27–17–1–1–1, Serial No. 08/904383, *Wireless Terminal With Auxiliary Desktop Unit*, Filed Aug. 1, 1997, now allowed.

U.S. Patent Application D.L. Chavez 28–18–2, Serial No. 08/904,382, *A Wireless Handset For Implementing A Virtual Office*, Filed Aug. 1, 1997, now allowed.

*Primary Examiner*—Fan Tsang
*Assistant Examiner*—Blane J. Jackson
*Attorney, Agent, or Firm*—John C. Moran

[57] ABSTRACT

A wireless terminal is dynamically placed into a call coverage group based on the auxiliary unit with which the wireless terminal is in communication. A wireless terminal can be in a plurality of call coverage groups and be assigned a relative position in each of these call coverage groups based on the auxiliary unit with which the wireless terminal is in communication. The call coverage groups are dynamic, and a wireless terminal will assume a different position within the call coverage group based on whether higher positions within the call coverage group assigned to other auxiliary units have wireless terminals in communication with these other auxiliary units. The wireless terminals of a call coverage group dynamically establish their position by communicating and identifying the other active wireless terminals and the auxiliary units to which these other wireless terminals are assigned with no involvement of the wireless switching system controlling the wireless terminals.

22 Claims, 11 Drawing Sheets

| TABLE 1 ||||
|---|---|---|---|---|
| ASSIGNED TELEPHONE NUMBER | AUX. CALL COVERAGE GROUP ||||
| 1901 | 102 | 106 | 103 | 104 |
| 1902 | 106 | 104 | 102 | 103 |

FIG. 10

| TABLE 2 ||||||
|---|---|---|---|---|---|
| ASSIGNED TELEPHONE NUMBER (1101) | COVERAGE DELAY (1102) | WIRELESS TERMINALS (1103) ||||
| 1901 | 10 | 111 | 114 | 112 | 113 |
| 1902 | 30 | 114 | 113 | 111 | 112 |

FIG. 11

| TABLE 2 ||||||
|---|---|---|---|---|---|
| ASSIGNED TELEPHONE NUMBER (1201) | COVERAGE DELAY (1202) | WIRELESS TERMINALS (1203) ||||
| 1901 | 10 | 111 | 114 | 112 | 113 |
| 1902 | 20 | 114 | 113 | 111 | 112 |

FIG. 12

| TABLE 2 ||||||
|---|---|---|---|---|---|
| ASSIGNED TELEPHONE NUMBER (1301) | COVERAGE DELAY (1302) | WIRELESS TERMINALS (1303) ||||
| 1901 | 10 | 112 | 114 | 111 | 113 |
| 1902 | 40 | 114 | 113 | 112 | 111 |

FIG. 13

| TABLE 3 ||
|---|---|
| ASSIGNED TELEPHONE NUMBER | COVERAGE DELAY |
| 1901 | 10 |
| 1902 | 30 |

FIG. 14

DYNAMIC CALL COVERAGE PATHS BASED ON AUXILIARY UNITS

TECHNICAL FIELD

This invention relates to wireless telecommunication terminals, and, in particular, to the provision of call coverage paths.

BACKGROUND OF THE INVENTION

In prior art business telecommunications switching systems, call coverage groups are well known. A call coverage group allows a list of telephones to be stored within the switching system to handle calls for a telephone of a principal. When the switching system receives a call for the principal's telephone and the principal's telephone does not answer, the switching system attempts to connect the calling party with the first telephone in the call coverage telephone group. If the first telephone is unavailable, then the second telephone in the call coverage group is selected. In the prior art, the call coverage groups are administered manually.

The prior art call coverage groups have functioned well with wired telephone sets and wireless telephones where the wireless telephone was a second telephone set for a user. In addition, prior art call coverage groups and their administration have functioned well for the traditional business environments where an employee is assigned a desk or a specific location and performs their principal work function at that telephone or location. For example, the traditional environment is for a principal to have a telephone and for the first telephone in the call coverage path for the principal's telephone to be the principal's secretary. The traditional environment is slowly changing. In the emerging business environment, individuals do not have a wired telephone but rather they have a wireless telephone which they carry with them at all times and which is their only telephone set. In addition, employees during the course of a day perform many functions at different locations. For example, a principal's secretary may vary with the time of day. Whereas, the principal's secretary maybe a different individual depending on the time of day; the individual performing the function of being the principal's secretary will be seated in the same physical location as other individuals performing that function. The reason for this is that the principal's secretary primary responsibility is in the emerging business environment is to serve as an administrative assistant whose function also includes being part of the call coverage path. Also, this secretary must be physically close to the principal's office. It is also normally considered quite desirable that the other individuals in the call coverage path also be physically close to the principal for which the call coverage group has been established.

SUMMARY OF THE INVENTION

The foregoing problems are solved, and a technical advance is achieved, by an apparatus and method in which a wireless terminal is dynamically placed into a call coverage group based on the auxiliary unit with which the wireless terminal is in communication. Advantageously, a wireless terminal can be in a plurality of call coverage groups and be assigned a relative position in each of these call coverage groups based on the auxiliary unit with which the wireless terminal is in communication. Advantageously, the call coverage groups are dynamic, and a wireless terminal will assume a different position within the call coverage group based on whether higher positions within the call coverage group assigned to other auxiliary units have wireless terminals in communication with these other auxiliary units. The wireless terminals of a call coverage group dynamically establish their position by communicating and identifying the other active wireless terminals and the auxiliary units to which these other wireless terminals are assigned with no involvement of the wireless switching system controlling the wireless terminals.

Advantageously, the communication between wireless terminals is controlled by a controlling wireless terminal with which the wireless terminal first communicates upon entering the location. Upon determining that it is leaving the location, the wireless terminal transmits a message to controlling wireless terminal to inform it of this fact. In turn, the controlling wireless terminal transmits messages to the other wireless terminals to inform them of the departure of the wireless terminal.

Other and further aspects of the present invention will become apparent during the course of the following description and by reference to the accompanying drawing.

BRIEF DESCRIPTION OF THE DRAWING

FIGS. 10–13 illustrate tables utilized by a wireless terminal;

FIG. 14 illustrates a table stored by an auxiliary unit;

DETAILED DESCRIPTION

Figure 1:
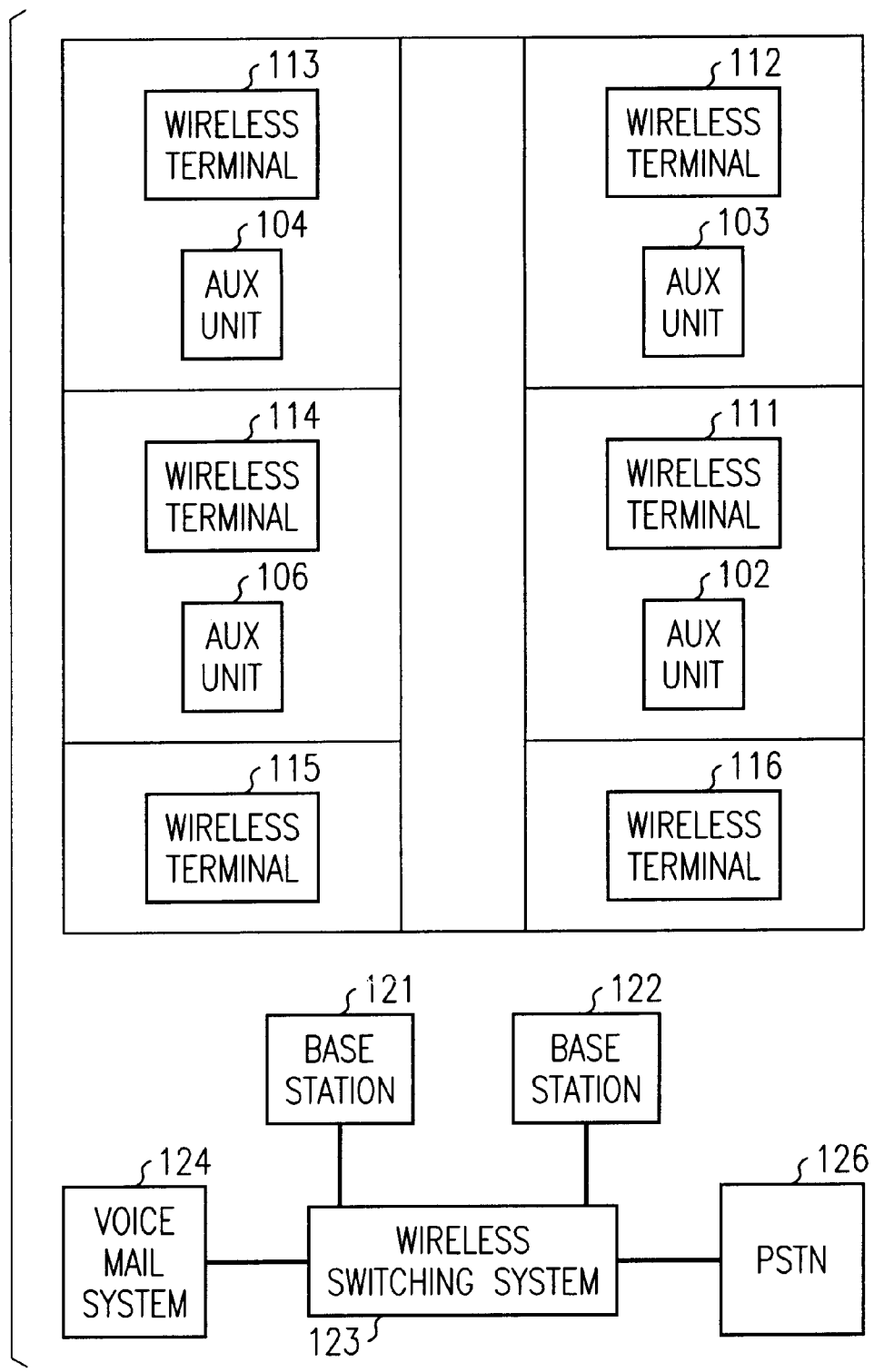
FIG. 1 illustrates, in block diagram form, a system for implementing the invention.
Figure 2:
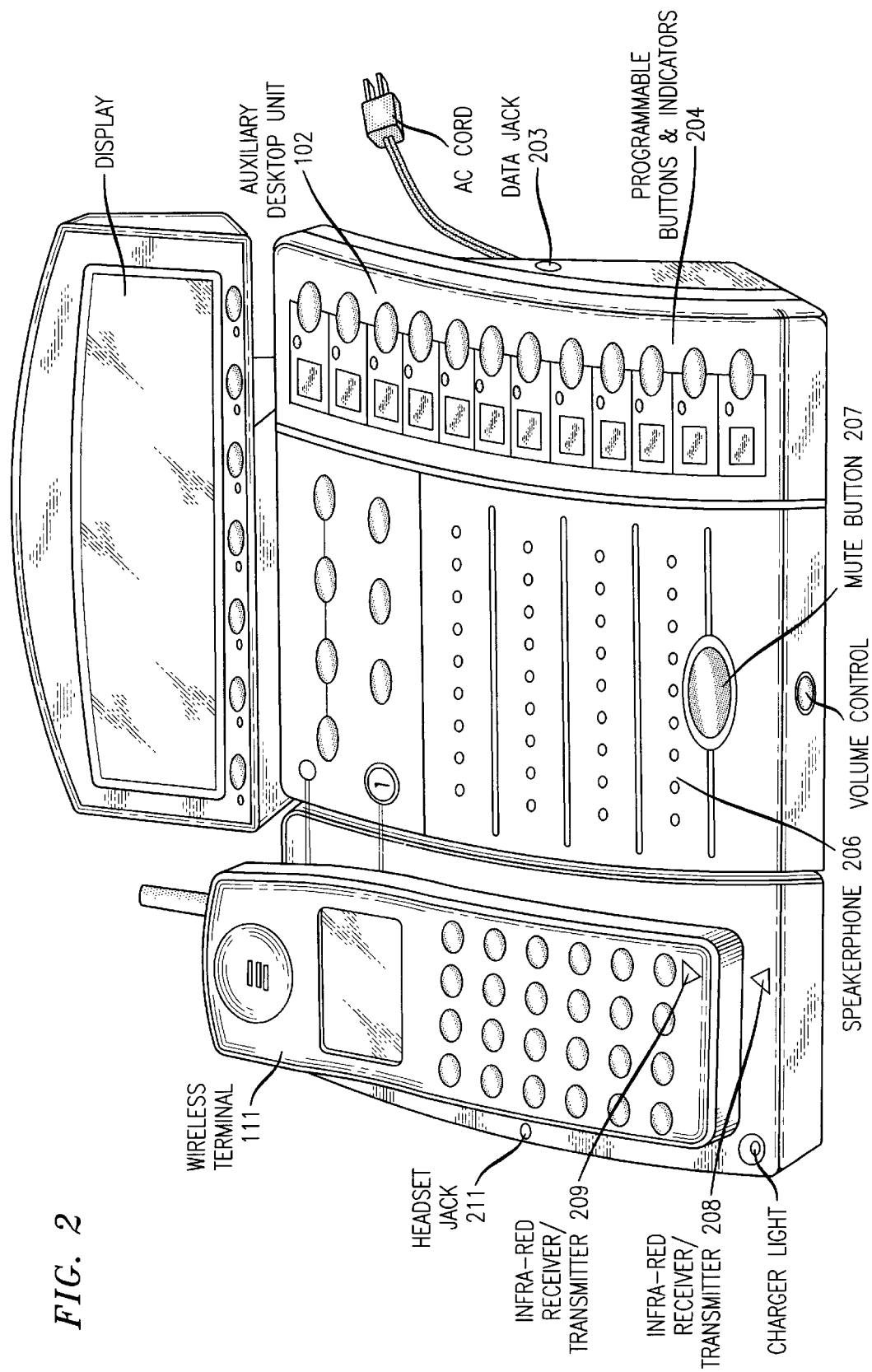
FIG. 2 illustrates a conceptual view of a wireless terminal inserted into an auxiliary desktop unit for use with the invention.

FIG. 1 illustrates a wireless system for implementing the invention. Details of auxiliary desktop unit 102 are illustrated in FIG. 2. The other auxiliary desktop units are identical in design. Control information is communicated between a wireless terminal and an auxiliary desktop unit by infra-red receiver/transmitters in the wireless terminal and in the auxiliary desktop unit. Auxiliary desktop unit 102 provides standard programmable buttons and indicators that are programmable to provide different telephone features and speed dialing.

Figure 3:
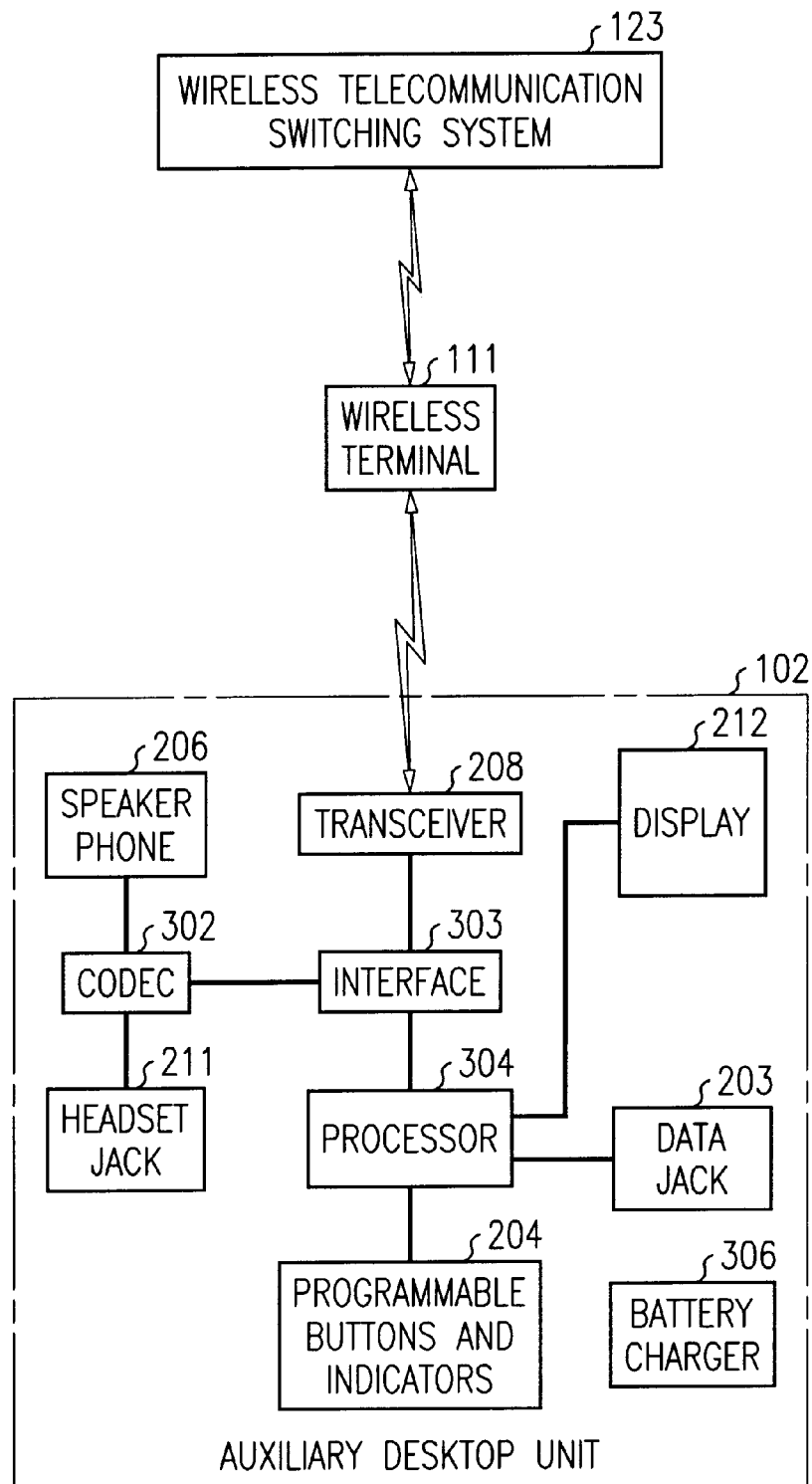
FIG. 3 illustrates, in block diagram form, the interconnection of the wireless terminal to a wireless telecommunication switching system and also to an auxiliary desktop unit.
Figure 4:
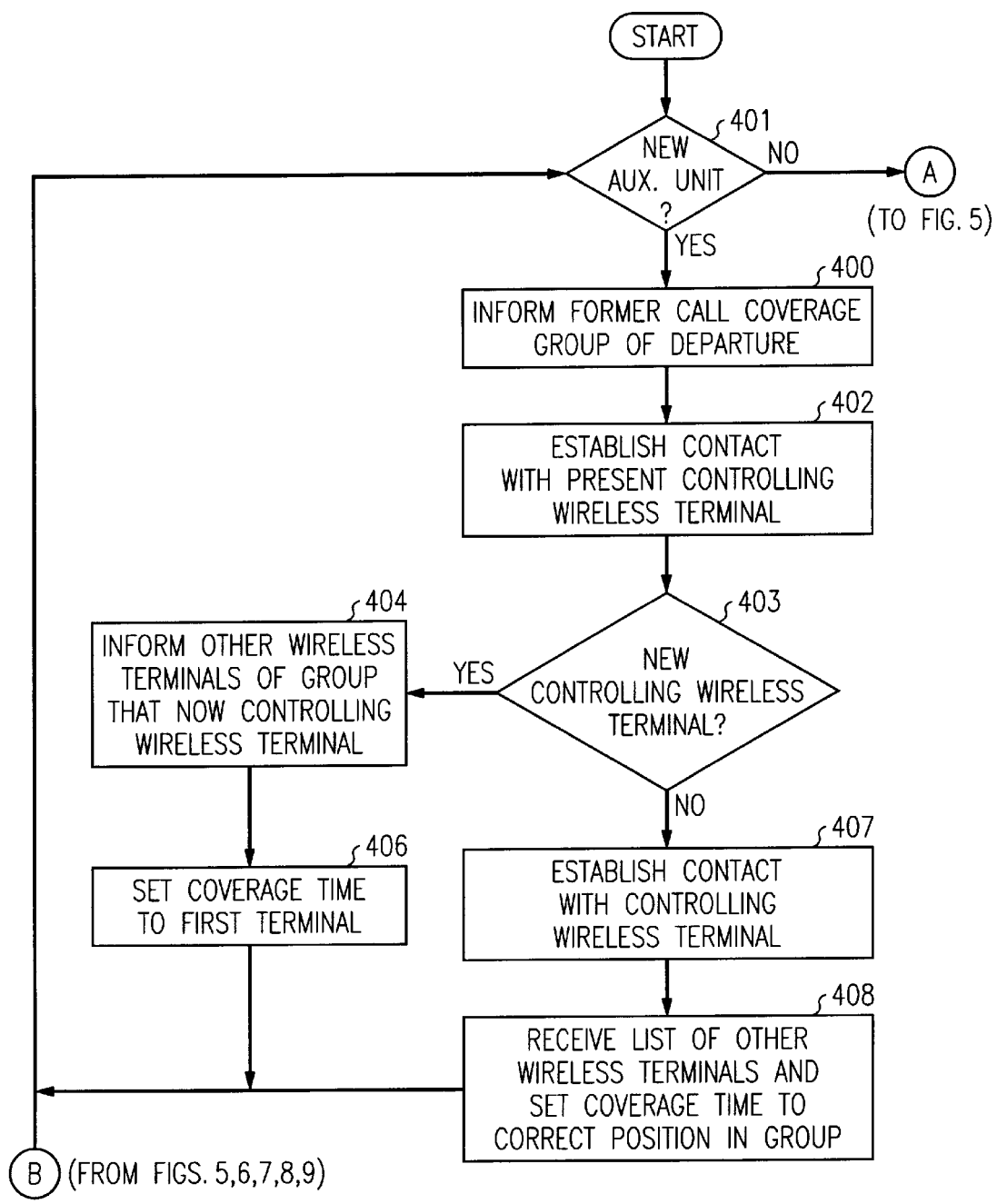
FIGS. 4–9 illustrate, in flow chart form, steps performed by a wireless terminal.

FIG. 3 illustrates a block diagram illustrating the interconnection between wireless telecommunication switching system 123, wireless terminal 111, and auxiliary desktop unit 102. Auxiliary desktop unit 102 is shown in greater detail in FIG. 3. Wireless terminal 111 is shown in greater detail in FIG. 16. Wireless terminal 111 performs all the call control and high level processing of messages from wireless telecommunication switching system 123. Communication of information between wireless terminal 111 and auxiliary desktop unit 102 is via infra-red transceiver 208 of FIG. 3 and transceiver 1621 of FIG. 16. One skilled in the art could readily envision other types of wireless links. Wireless terminal 111 maintains a control channel, a voice channel, and a data channel with auxiliary desktop unit 102 via the infra-red link. The protocol used on the infra-red link can be any number of well known protocols. Within auxiliary desktop unit 102, interface 303 disassembles and assembles information being communicated on the infra-red link set up between transceivers 208 and 1621. The voice information is routed to or from voice code 302 for use either by speakerphone 206 or a headset plugged into headset jack 211. Data information is routed to or from a data device connected on data jack 203. When the infra-red link is first established, processor 304 transmits the identification code for auxiliary desktop unit 102 to wireless terminal 111 which transmits the identification code to wireless switching system 123. Control information is communicated by interface 303 with processor 304. The control information is utilized by processor 304 to control the operations of display 212 and the indicators on subunit 204. Actuation of a programmable button causes processor 304 to transmit control information via interface 303, transceiver 208, and transceiver 1621, to wireless terminal 111. Wireless terminal 111 is responsive to this control information to form a high level PHS wireless message that specifies which programmable button has been actuated. Similarly, wireless telecommunication switching system 123 transmits control information to wireless terminal 111 specifying which indicator on auxiliary desktop unit 102 is to be turned on via a high level PHS wireless message. Wireless terminal 111 decodes the PHS wireless message from wireless telecommunication switching system 123 and sends a message via the control channel of the infra-red link to processor 304 specifying that the indicator is to be lit. Wireless telecommunication switching system 123 processes the control information from auxiliary desktop unit 102 to provide features and other telephony operations using techniques well understood by those skilled in the art.

To understand a first embodiment of the invention, consider the following example. Each wireless terminal that can be attached to an auxiliary unit stores Tables 1 and 2 as illustrated in FIGS. 10 and 11, respectively. An attached wireless terminal also maintains internally the identification of the auxiliary unit to which it is attached. Table 1 of FIG. 10 is common to all of the wireless terminals; however, Table 2 is individual to each wireless terminal. As illustrated, Table 2 of FIG. 11 is that maintained by wireless terminal 111 when attached to auxiliary unit 102. In the call coverage path for wireless terminal 111, Table 1 of FIG. 10 illustrates that the assigned telephone number is "1901" and that auxiliary unit 102 is the first auxiliary unit in the call coverage path. For wireless terminal 116, auxiliary unit 102 is the third position in the call coverage path. Hence, column 1102 of FIG. 11 has 10 seconds of delay in responding to calls directed to telephone number "1901" and 30 seconds of delay in responding to telephone calls directed to telephone number "1902".

When wireless terminal 111 came into communication with auxiliary unit 102 it received the auxiliary unit's identification and proceeded to negotiate with the other wireless terminals illustrated in FIG. 1 its position within the auxiliary call coverage group. As will be described in greater detail later, when wireless terminal 111 begins communication with auxiliary unit 102, it contacts the wireless terminal unit that is presently controlling the call coverage group for both telephone number 1901 and 1902. Since auxiliary unit 102 is the first unit in the call coverage path for telephone number 1901, wireless terminal 111 assumes the responsibility as the controlling wireless terminal for that call coverage group and transmits this information via data calls to the other wireless terminals in the call coverage group. Note, that wireless terminal 111 initially makes a contact with the present controlling wireless terminal by transmission of a transceiver alert message which defines the telephone number of wireless terminal 111 to the controlling wireless terminal. The controlling wireless terminal then sets up a data call to wireless terminal 111 and transfers the identities of the other wireless terminals to wireless terminal 111. Wireless terminal 111 then negotiates with the present controlling wireless terminal for control of the call coverage group. In response to data messages from wireless terminal 111, the other wireless terminals adjust their coverage delay time to reflect their new position in the call coverage group for telephone number 1901. With respect to the call coverage group for telephone number 1902, the process is similar. However, wireless terminal 111 does not become the controlling wireless terminal since its position in the call coverage group is third for the call coverage group for telephone number 1902. However, the controlling wireless terminal (as illustrated in FIG. 11 wireless terminal 114) transmits the position of wireless terminal 111 in the call coverage groups to the other wireless terminals, and the other wireless terminals adjust their coverage delays to reflect that wireless terminal 111 now is in the third position of the call coverage group as required. A wireless terminal does not indicate that there is a call for a telephone number in a call coverage group until the call coverage delay has elapsed for that wireless terminal.

Two situations can modify the amount of coverage delay that a wireless terminal waits before responding to a call to an assigned number. First, a wireless terminal having a higher priority in the call coverage path may invoke the send all call features, and second, one of the auxiliary units having a higher priority in the call coverage group may not be in communication with a wireless terminal. For example, in the call coverage group for wireless terminal 115, if wireless telephone 114 is in communication with auxiliary unit 106 and activates the send all calls feature, wireless terminal 113, that is in communication with auxiliary unit 104, modifies its call coverage delay to 10 seconds, and wireless terminal 111, that is in communication with auxiliary unit 102, modifies its call coverage delay to 20 seconds as illustrated in Table 2 of FIG. 12 for wireless terminal 111. Assume that the user of wireless terminal activates the send all calls feature. Since wireless terminal 114 is controlling the call coverage group for telephone number 1902, wireless terminal 114 establishes data calls to each of the other wireless terminals using the information that is stored in the equivalent of column 1103 of FIG. 11 for wireless terminal 114. Via these data calls, wireless terminal 114 indicates that it has invoked the send all calls feature. Each of the other wireless terminals in the call coverage group for telephone number 1902 adjust their position within the call coverage group by decreasing their call coverage delay time. If the call had been for telephone number 1901 and wireless terminal 114 had activated the send all calls feature, wireless terminal 114 would establish a data call to wireless terminal 111, controlling wireless terminal for the call coverage group of telephone number 1901, and inform wireless terminal 111 that wireless terminal 114 had invoked the send all calls feature. In response, wireless terminal 111 would establish data calls to wireless terminals 112 and 113 informing them of this fact. Only wireless terminals 112 and 113 would decrease their coverage delay time. When a wireless terminal in a call coverage path invokes the send all call feature, the remaining wireless terminals having lower priority than that wireless terminal only temporarily change their call coverage delay for the present incoming call and change the coverage delay back to the original value after the wireless terminal deactivates send all calls which is similar to the method for activation of send all calls. The message that is transmitted by the wireless terminal that has invoked the send all calls feature includes the assigned telephone number and the auxiliary unit to which the wireless terminal is in communication.

The second situation that will cause a wireless terminal to modify the call coverage delay illustrated in Table 2 of FIGS. 11 and 12 is if an auxiliary unit higher in priority in the call coverage path is not in communication with a wireless terminal. For example, for the call coverage group assigned telephone number "1902", if wireless terminal 113 stops communication with auxiliary unit 104 and no other auxiliary unit commences communication, wireless terminals 111 and 112 reduce their call coverage delay by 10 seconds. This change in call coverage delay is permanent until another wireless terminal starts communication with auxiliary unit 104. The controlling wireless terminals periodically establishes data calls to each of the wireless terminals in the call coverage group controlled by the controlling wireless terminal. If a wireless terminal does not respond to the data call from the controlling wireless terminal, the controlling wireless terminal assumes that the non-responsive wireless terminal has left the call coverage group. In addition, when a wireless terminal ceases communications with the auxiliary unit, the wireless terminal attempts to place a data call to the controlling wireless terminal informing the controlling wireless terminal that it has left the call coverage group. Unless the departing wireless terminal has been shut off or has left the total call coverage area of wireless switching system 123, the wireless terminal should be able to establish a data call to the controlling wireless terminal. Otherwise, the controlling wireless terminal determines the absence of the wireless terminal by means of the periodic data call. If the controlling wireless terminal for a call coverage group leaves, the next highest wireless terminal in the call coverage group upon not receiving the periodic data call assumes the position of the controlling wireless terminal. The next highest wireless terminal sets up data calls to the other wireless terminals in the call coverage group informing them of the new controlling wireless terminal. For example, if wireless terminal 111 as illustrated in FIG. 11 leaves the call coverage group, wireless terminal 114 assumes the role of the controlling wireless terminal after the periodic data call is not received from wireless terminal 111. In addition before departing, wireless terminal 111 will attempt to establish a data call to wireless terminal 114 to inform wireless terminal 114 of the departure.

Table 2 of FIG. 13 illustrates the changes made in Table 2 as stored by wireless terminal 111 if wireless terminal 111 and 112 exchange positions such that wireless terminal 111 is in communication with auxiliary unit 103 and wireless terminal 112 is in communication with auxiliary unit 102. Wireless terminal 111 now has assumed a different position in the call coverage paths for the call coverage groups for wireless terminals 115 and 116.

In the second embodiment of the invention, each auxiliary unit only stores its relative position in the call coverage groups on the basis of the assigned telephone number of a call coverage group and the call coverage delay time for that number. When a wireless terminal commences communication with an auxiliary unit, the auxiliary unit transfers this call coverage information to the wireless terminal. The call coverage information is transferred to the auxiliary units by wireless switching system 123 via an attached/ communicating wireless terminal as required to update the call coverage groups. One skilled in the art could readily envision that the auxiliary units could have other communication means to the wireless switching systems in order to receive this call coverage information from wireless switching system 123. In addition, the information could be manually entered into the auxiliary unit either via buttons that are part of the auxiliary unit or via the buttons on a wireless terminal in communication with the auxiliary unit. Table 3 of FIG. 14 illustrates the information that is stored by auxiliary unit 102. The other auxiliary units store similar tables. Upon receipt of Table 3 of FIG. 14, wireless terminal 111 utilizes this information in the same manner as Table 2 of the first embodiment of the invention. With the exception, that when a wireless terminal has invoked the send all calls function, it transmits the assigned telephone number and the call coverage delay. Utilizing the call coverage delay, the other wireless terminals are able to determine how to adjust their own call coverage delays.

Figure 15:
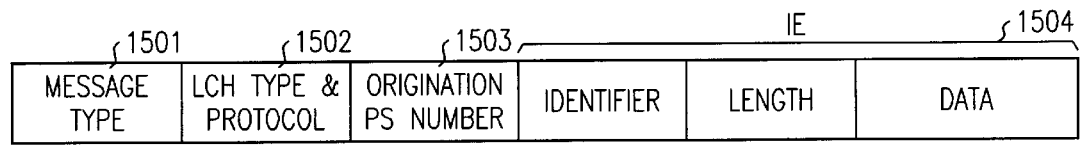
FIG. 15 illustrates a transceiver alert message.

FIGS. 4–9 illustrate, in flow chart form, the steps performed by a wireless terminal. After being started, decision block 401 determines if contact has been made with a new auxiliary unit. If the answer is yes, Block 400 informs the former call coverage group of the departure of the wireless terminal. If the wireless terminal was the controlling wireless terminal in the former call coverage group, the wireless terminal transmits via a data call a message to the wireless terminal having the next highest priority informing that wireless terminal that it is the new controlling wireless terminal. If the departing wireless terminal was not the controlling wireless terminal, it transmits a message via a data call to the controlling wireless terminal informing the controlling wireless terminal of its departure. In either case, the resulting controlling wireless terminal of the former call coverage group then informs the other wireless terminals of the call coverage group of the departure. After execution of Block 400, control is transferred to Block 402. The wireless terminal establishes contacts with the present controlling wireless terminal by transmission of a transceiver alert message in block 402 as illustrated in FIG. 15. The present controlling wireless terminal responds to this message with a disconnect and then transmits a data call to the present wireless terminal. After execution of block 402, control is transferred to decision block 403 which determines if the present wireless terminal is the new controlling wireless terminal. Note, that the response to the transceiver alert message from the present controlling wireless terminal identified the telephone number of the present wireless terminal allowing the present controlling wireless terminal to setup a data call. If no response is received to the transceiver alert message, the present wireless terminal executes block 404. If the present wireless terminal is the new controlling wireless terminal, which means that it is higher in the call coverage priority list than the current controlling wireless terminal, control is transferred to block 404 which informs the other wireless terminals in the call coverage group that the present wireless terminal is now the controlling wireless terminal. Then, block 406 sets the coverage time of the present wireless terminal to be the first terminal in the call coverage group before returning control to decision block 401.

If the present wireless terminal is not the new controlling wireless terminal, control is transferred from decision block 403 to block 407 which establishes contact with the controlling wireless terminal. Then, block 408 receives the list of other wireless terminals in the call coverage group and sets the coverage time for the correct position of the present wireless terminal in the call coverage group before returning control to decision block 401.

Figure 5:
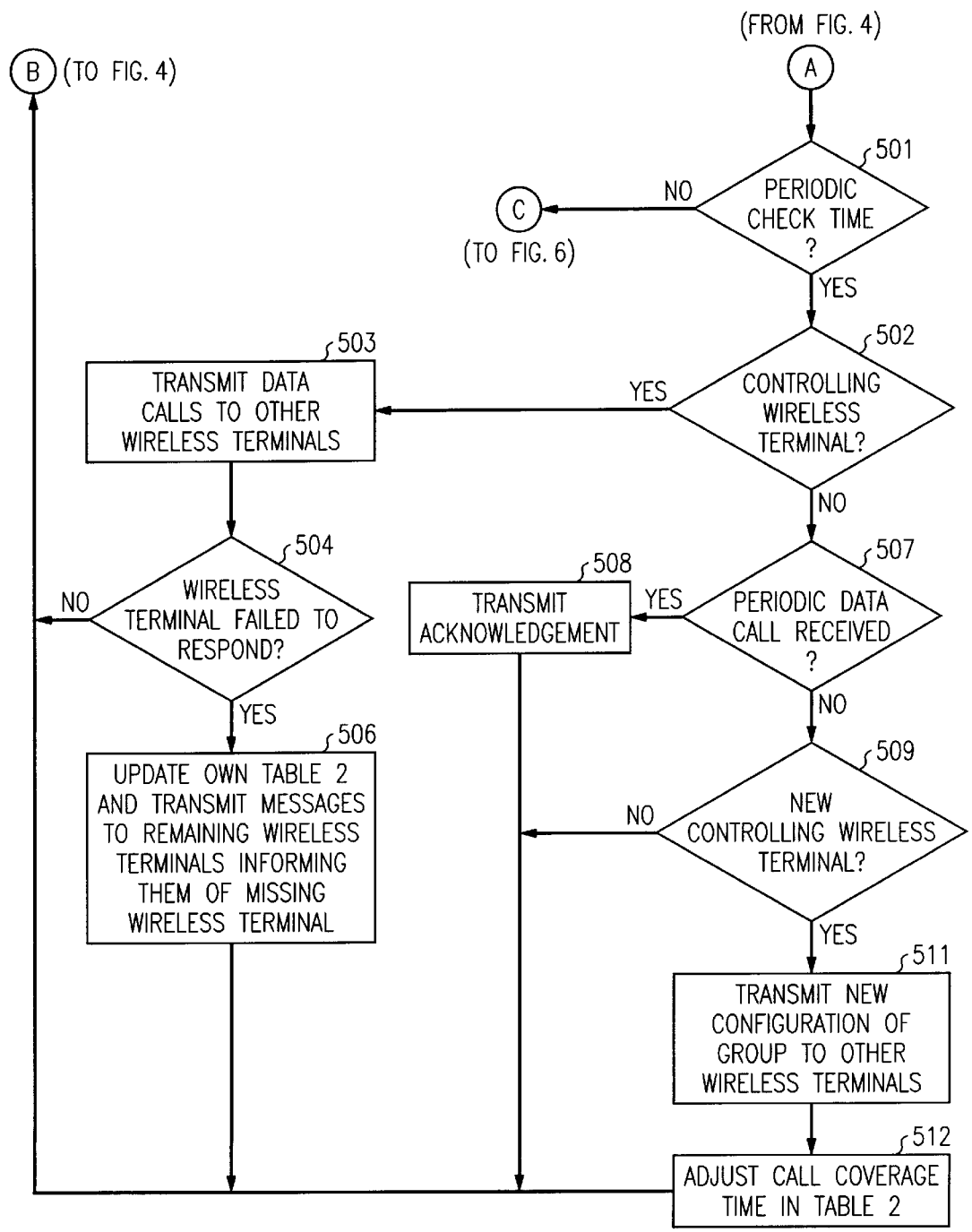

Returning to decision block 401, if communication has not been established with a new auxiliary unit, control is transferred to decision block 501 of FIG. 5. Decision block 501 determines if the time has expired for the periodic check of the wireless terminals presently in a call coverage group. If the answer is yes, control is transferred to decision block 502 which determines if the present wireless terminal is a controlling wireless terminal in a call coverage group. Note, that the present embodiment only allows for a wireless terminal to be the controlling wireless terminal in one call coverage group. However, one skilled in the art could readily see that blocks 502–506 could be repeated to handle all of the call coverage groups in which the present wireless terminal is the controlling wireless terminal. If the answer is yes in decision block 502, block 503 transmits data calls to each of the other wireless terminals in the call coverage group. Decision block 504 determines if any of these wireless terminals failed to respond to the data call. If the answer is no, control is transferred back to decision block 401 of FIG. 4. If the answer is yes in decision block 504, block 506 updates the Table 2 of the present wireless terminals and transmits messages to the remaining wireless terminals in the call coverage group informing them of the missing wireless terminal before transferring control back to decision block 401 of FIG. 4.

If the answer in decision block 502 is that the present wireless terminal is not the controlling wireless terminal of the call coverage group, control is transferred to decision block 507. The latter decision block determines if a periodic data call has been received. If the answer is yes, block 508 transmits back an acknowledgement message before returning control to decision block 401 of FIG. 4. If the answer in decision block 507 is no which indicates that the controlling wireless terminal has left the call coverage group. Decision block 509 determines if the present wireless terminal is the new controlling wireless terminal. If the answer is no, control is transferred back to decision block 401 of FIG. 4. If the answer is yes, block 511 transmits the new configuration of the call coverage groups to the other wireless terminals in the call coverage group, and block 512 adjusts the call coverage time for the present wireless terminal before transferring control back to decision block 401 of FIG. 4.

Figure 6:
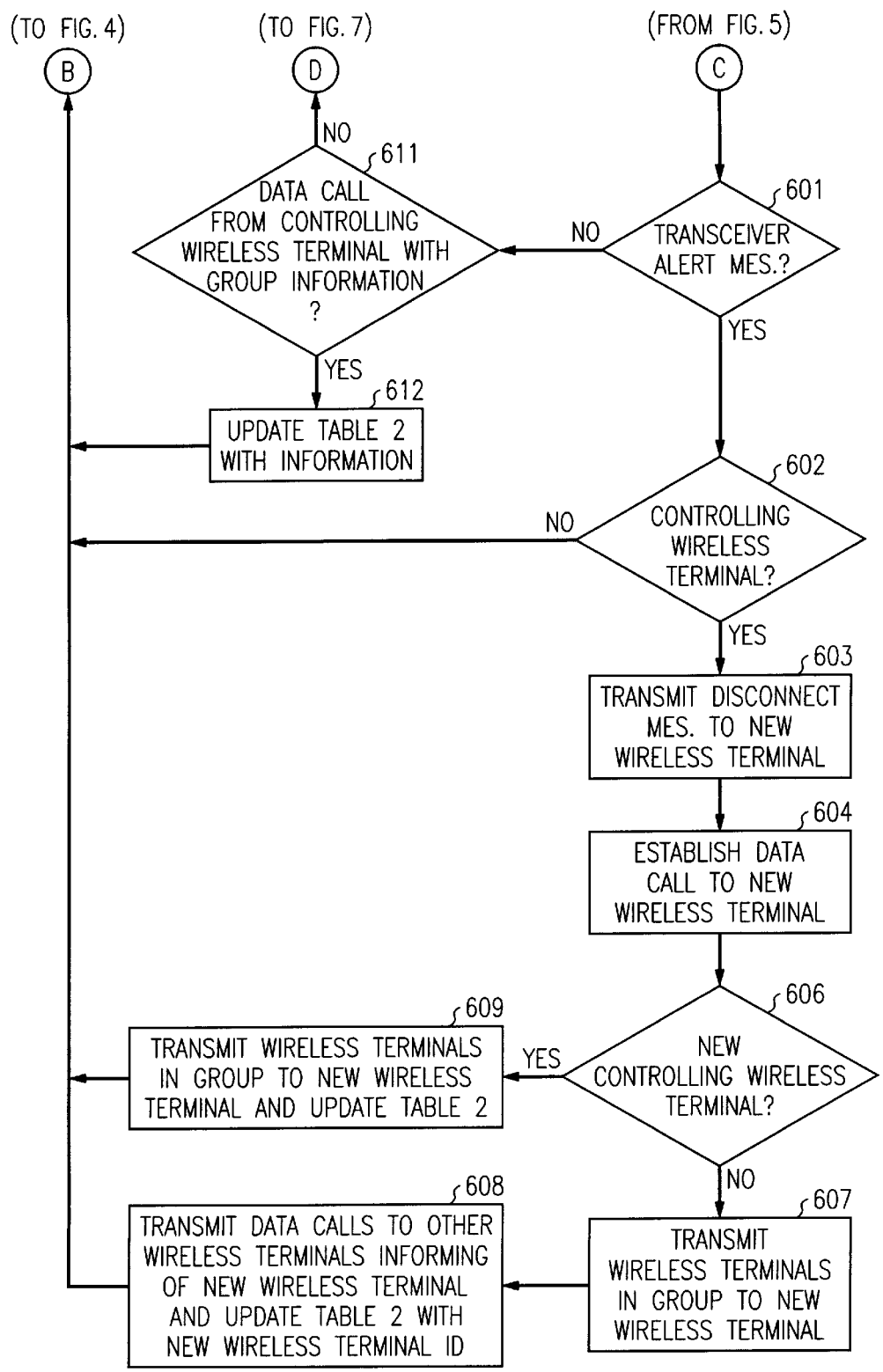

Returning to decision block 501, if the answer is no, control is transferred to decision block 601 of FIG. 6. Decision block 601 determines if a transceiver alert message has been received from another wireless terminal. If the answer is yes, decision block 602 determines if the present wireless terminal is the controlling wireless terminal for the call coverage group. If the answer is no, the present wireless terminal makes no response to the transceiver alert message but transfers control back to decision block 401 of FIG. 4. If the answer is yes in decision block 602, block 603 transmits a disconnect message to the new wireless terminal, and block 604 establishes a data call to the new wireless terminal. Decision block 606 determines if the new wireless terminal is to be the controlling wireless terminal of the call coverage group. If the answer is yes, block 609 transmits the identification of the wireless terminals in the call coverage group to the new wireless terminal and updates Table 2 of the present wireless terminal to reflect the new controlling wireless terminal before transferring control back to decision block 401 of FIG. 4. If the answer in decision block 606 is no, block 607 transmits the identification of the other wireless terminals in the call coverage group to the new wireless terminal, and block 608 transmits data calls to the other wireless terminals of the call coverage group informing them of the identifications of the new wireless terminals and updates Table 2 of the present wireless terminal with the identification of the new wireless terminal before transferring control back to decision block 401 of FIG. 4.

Returning to decision block 601, if the answer is no, control is transferred to decision block 611. If a data call has been received from the controlling wireless terminal with call coverage group information, the answer is yes in decision block 611. If the answer is yes, block 612 updates Table 2 of the present wireless terminal with the new call coverage group information before returning control back to decision block 401 of FIG. 4. If the answer is no in decision block 611, control is transferred to decision block 701 of FIG. 7.

Decision block 701 determines if a page message has been transmitted by wireless switching system 123 for a group call coverage number. If the answer is yes, block 703 waits the amount of time specified by the coverage delay time for the call coverage group. Then block 704 responds to the page and indicates the page that is being responded to. Block 706 then performs normal processing before returning control back to decision block 401 of FIG. 4.

If the answer in decision block 701 is no, decision block 702 determines if communication has been lost with the auxiliary unit. If the answer is yes, control is transferred to decision block 707. The latter decision block determines if the present wireless terminal is the controlling wireless terminal for the call coverage group. If the answer is no, control is transferred to block 709 which transmits a message to the controlling wireless terminal for the call coverage group informing it that the present wireless terminal has left the call coverage group. If the answer is yes in decision block 707, block 708 transmits a message to the next highest priority wireless terminal in the call coverage group informing that wireless terminal that it is the new controlling wireless terminal. One skilled in the art would readily see that it may be necessary to perform both block 708 and 709 if the present wireless terminal is part of more than one call coverage group. It would be a immediately clear to one skilled in the art how to modify the operation of blocks 707–709 to account for multiple call coverage groups. After execution of either block 708 or 709, control is transferred back to decision block 401 of FIG. 4.

Figure 7:
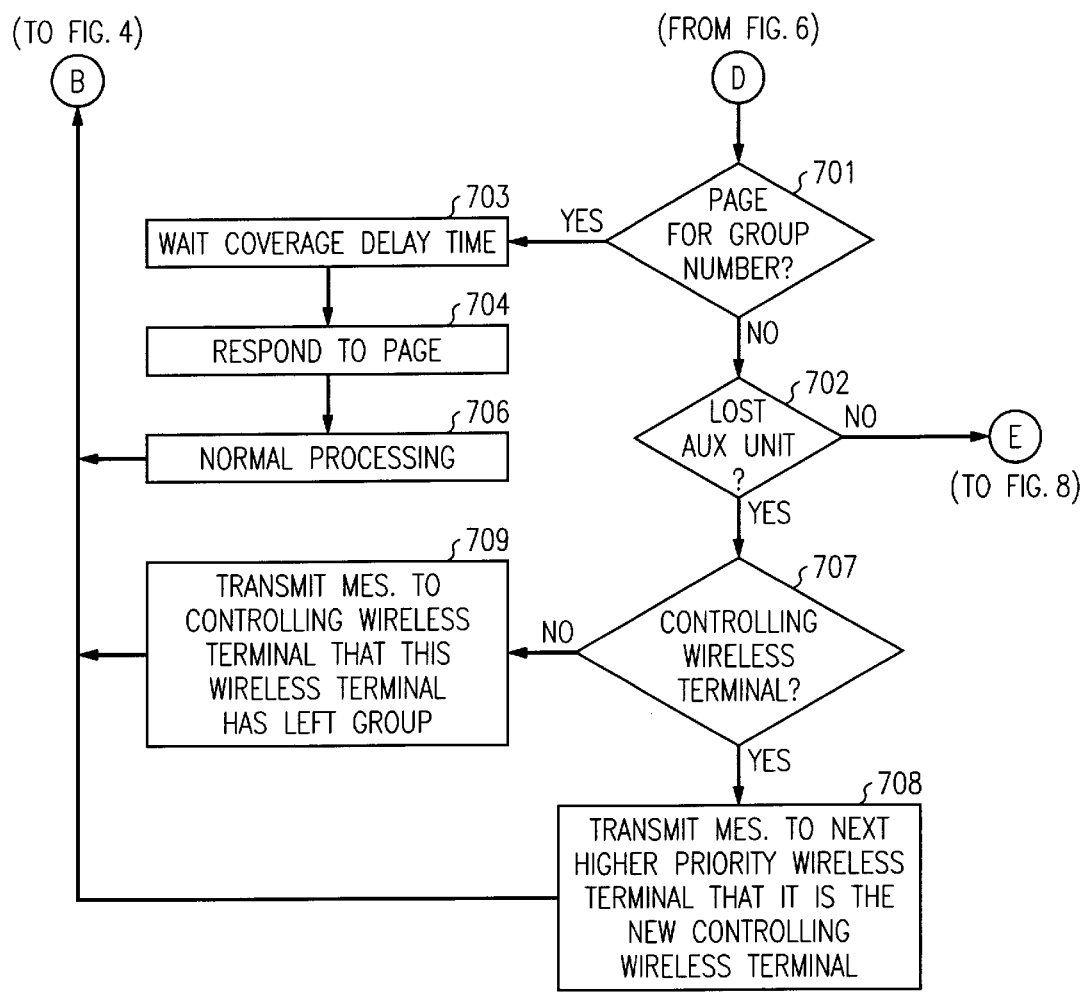
Figure 8:
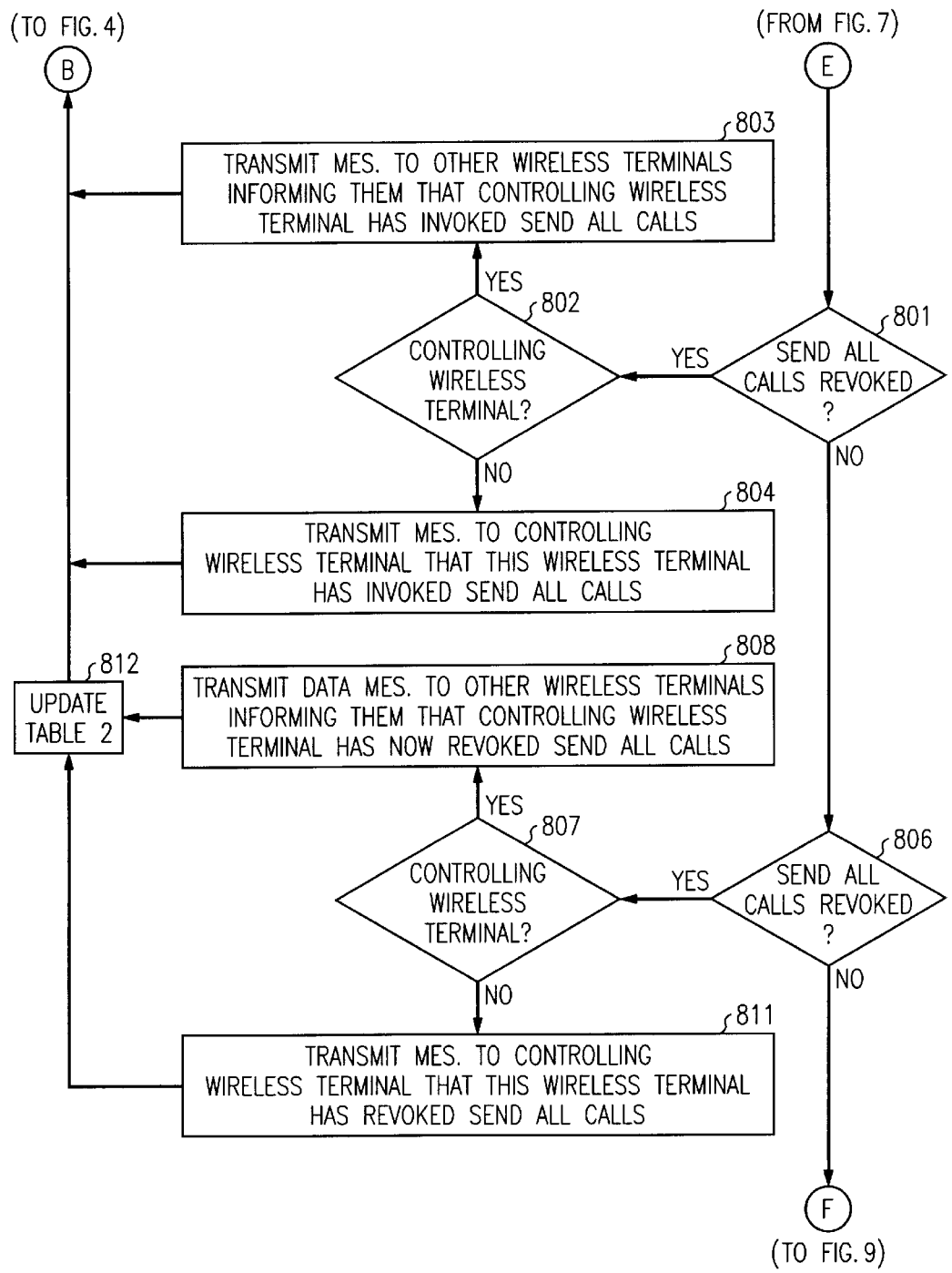

Returning to decision block 702 of FIG. 7, if the answer is no that communication has not been lost with a fixed unit, control is transferred to decision block 801 of FIG. 8. The latter decision block determines if the send all calls feature has been invoked. If the answer is yes, decision block 802 determines if the wireless terminal is the controlling wireless terminal. If the answer is yes, block 803 transmits messages to the other wireless terminals in the call coverage group informing those terminals that the controlling wireless has invoked the send all call feature before transferring control back to decision block 401 of FIG. 4. If the answer in decision block 802 is no, block 804 transmits a message to the controlling wireless terminal that the present wireless terminal has invoked the send all calls feature before returning control back to decision block 401 of FIG. 4.

Returning to decision block 801, if the send all calls feature has not been invoked, decision block 806 determines if the send all calls feature has been revoked. If the answer is yes, decision block 807 determines if the present wireless terminal is the controlling wireless terminal. If the answer is yes, block 808 transmits data messages to the other wireless terminal informing them that the controlling wireless terminal has revoked the send all calls feature. After execution of block 808, block 812 updates Table 1 before transferring control back to decision block 401 of FIG. 4. If the answer is no in decision block 807, block 811 transmits a message to the controlling wireless terminal informing that wireless terminal that the present wireless terminal has revoked the send all calls feature before transferring control to block 812.

Figure 9:
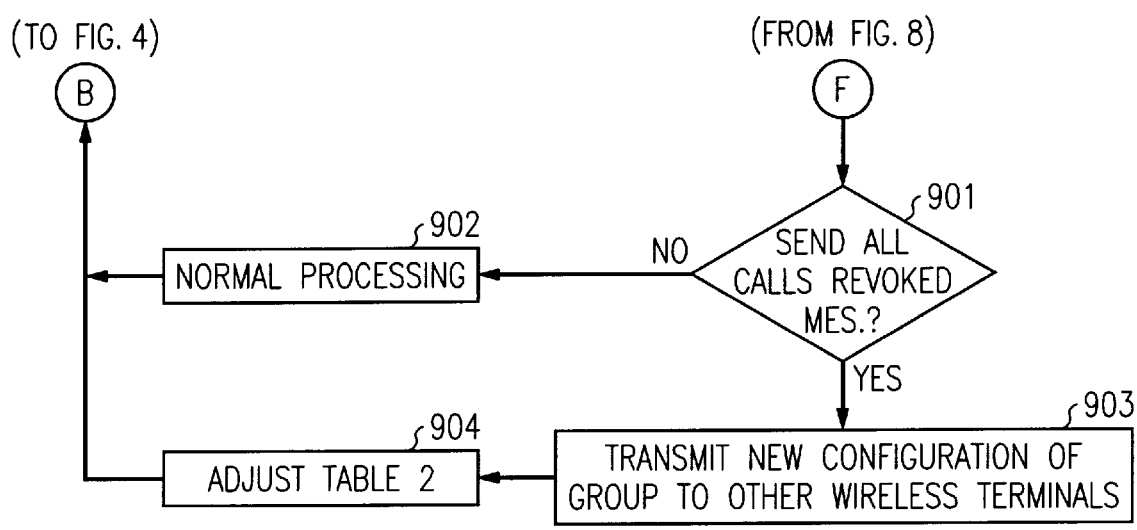

Returning to decision blocks 806, if the answer is no, control is transferred to decision block 901 of FIG. 9. The latter decision block determines if a send all calls revoked message such as would have been sent by block 811 of FIG. 8 has been received. If the answer is no, block 902 performs normal call processing before returning control to decision block 401 of FIG. 4. If the answer is yes in decision block 901, block 903 transmits the new configuration of the call coverage group to the other wireless terminals in the call coverage group, and block 904 makes the necessary changes in Table 2 before returning control to decision block 401 of FIG. 4.

Figure 16:
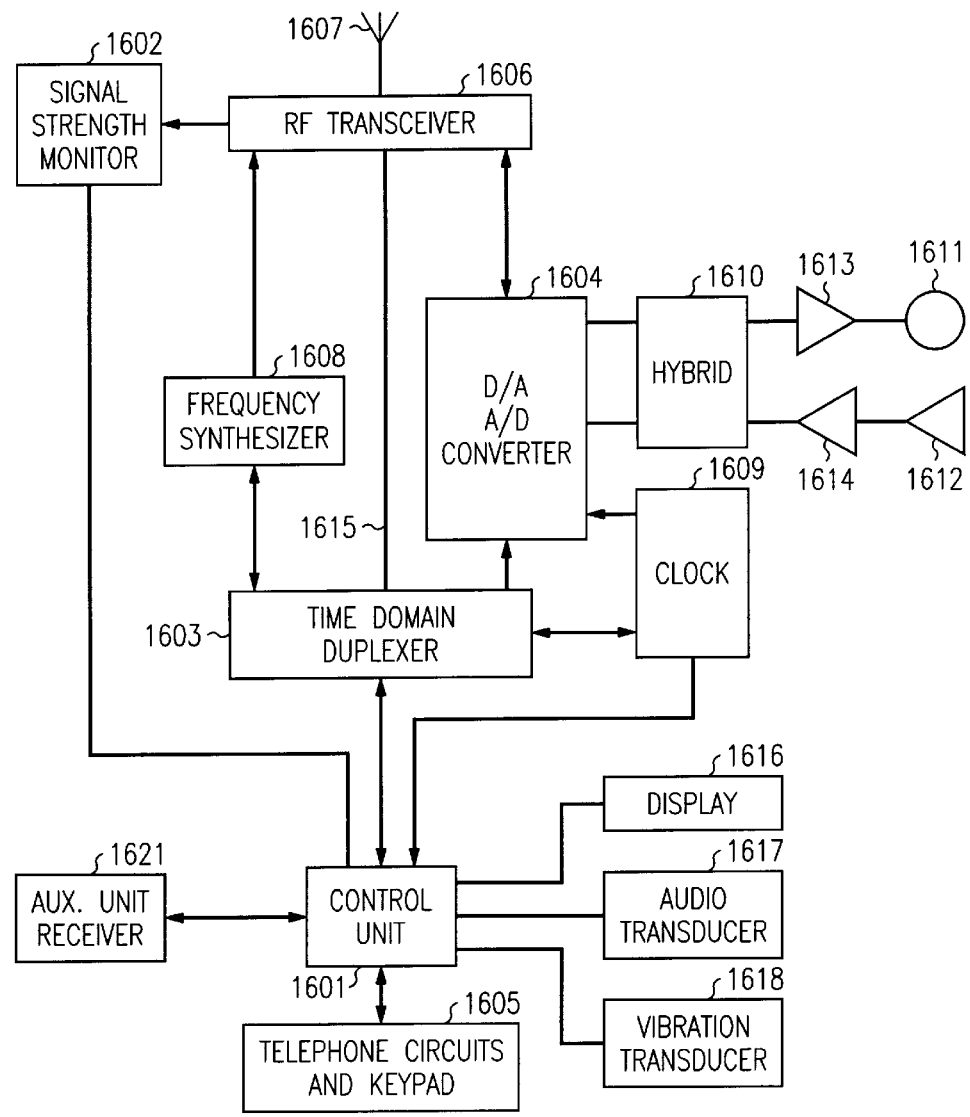
FIG. 16 illustrates, in block diagram form, a wireless terminal.

Wireless terminal 111 is illustrated in greater detail in FIG. 16. Wireless terminal 111 implements a wireless protocol that allows wireless terminal 111 to maintain a wireless signal link with wireless switching system 123 via base stations 121–122. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless terminal is provided by control unit 1601. Units 1602, 1603, 1606, 1607, 1608, and 1609 provide the RF communication capabilities for the wireless terminal. Elements 1604, 1610, and 1611–1614 provide the audio information received and transmitted to the user; whereas, elements 1616–1618 and 1605 provide the basic user interface. The PHS protocol allows control unit 1601 to establish a logical data channel with wireless switching system 123. Control unit 1601 utilizes this logical data channel to transmit identification information for auxiliary units to wireless switching system 123. Auxiliary unit transceiver 1621 receives the identification code of an auxiliary unit and transfers this identification code to control unit 1601. Control unit 1601 transmits audio and control information to the auxiliary unit via auxiliary unit transceiver 1621. Auxiliary unit receiver 1621 is of a design well known in the art for either infrared or ultrasonic transmission media. Further, control unit 1601 could also tune auxiliary unit transceiver 1621 to receive different frequencies or other variations of the transmission media using well known techniques in the art.

Of course, various changes in modification to the illustrated embodiment described above will be apparent to those skilled in the art. These changes and modifications can be made without departing from the spirit and scope of the invention and without diminishing its intended advantages. It is therefore intended that such changes and modifications be covered by the following claims.

What is claimed is:

1. A method for establishing a plurality of call coverage groups, comprising the steps of:

assigning each of a plurality of auxiliary units to one or more of the plurality of call coverage groups;

establishing communication by one of a plurality of wireless terminals with one of the plurality of auxiliary units; and entering by the one of the plurality of wireless terminals into each of the plurality of call coverage groups to which the one of the plurality of auxiliary units is assigned.

2. The method of claim 1 wherein the step of assigning comprises the step of determining positions for each of the plurality of auxiliary units in each of the assigned ones of the plurality of call coverage groups.

3. The method of claim 2 wherein the step of entering comprises the step of arranging a position for the one of the plurality of wireless terminals by the one of the plurality of wireless terminals and other ones of the plurality of wireless terminals that are part the each of the plurality of call coverage groups assigned to the one of the plurality of auxiliary units.

4. The method of claim 3 wherein within each of the plurality of call coverage groups communication between wireless terminals of each of the plurality of call coverage groups is controlled by a controlling one of the plurality of wireless terminals that is part of each of the plurality of call coverage groups.

5. The method of claim 4 wherein the step of entering further comprises the step of contacting the controlling one of the plurality of wireless terminals for each of the call coverage groups assigned to the one of the plurality of auxiliary units.

6. The method of claim 5 wherein the step of contacting comprises the step of transmitting a wireless terminal-to-wireless terminal message to the controlling one of the plurality of wireless terminals by the one of the plurality of wireless terminal.

7. The method of claim 6 wherein the wireless terminal-to-wireless terminal message includes an identification of the one of the plurality of auxiliary units.

8. The method of claim 5 wherein the step of contacting comprises determining whether the one of the plurality of wireless terminals should replace the controlling one of the plurality of wireless terminals as a new controlling one of the plurality of wireless terminals.

9. The method of claim 8 wherein the controlling one of the plurality of wireless terminals for each of the plurality of call coverage groups is determined by a predefined algorithm.

10. The method of claim 5 further comprises the steps of losing communication with the one of the plurality of auxiliary units by the one of the plurality of wireless terminal; and transmitting in response to the lose of communication a message to each of the controlling ones of the plurality of wireless terminals of the plurality of call coverage groups to which the one of the plurality of auxiliary units is assigned to inform each of the controlling one of the plurality of wireless terminals that the one of the plurality of wireless terminals is no longer part of the call coverage group controlled by each of the controlling one of the plurality of wireless terminals.

11. The method of claim 10 further comprises the step of transmitting a message defining that the one of the plurality of wireless terminals is no longer part of the call coverage group controlled by the transmitting controlling one of the plurality of wireless terminals to other ones of the plurality of wireless terminals that are part of the call coverage group controlled the transmitting controlling one of the plurality of wireless terminals.

12. The method of claim 4 further comprises the step of transmitting a periodic message by each controlling one of the plurality of wireless terminals to each one of the plurality of wireless terminals of the call coverage group controlled by the transmitting controlling one of the plurality of wireless terminals to determine the presence of each one of the plurality of wireless terminals that is part of the call coverage group controlled by transmitting controlling one of the plurality of wireless terminal.

13. The method of claim 4 further comprises the steps of detecting an actuation of a send all calls feature on the one of the plurality of wireless terminals; and transmitting a first message to the controlling one of the plurality of wireless terminals for each of the plurality of call coverage groups by the one of the plurality of wireless terminals to inform the controlling one of the plurality of wireless terminals that the one of the plurality of wireless terminals has activated the send all calls feature.

14. The method of claim 13 further comprises the step of transmitting a second message by the controlling one of the plurality of wireless terminals for each of the plurality of call coverage groups in response to the message to each of the other ones of the plurality of wireless terminals in the call coverage group controlled by the transmitting controlling one of the plurality of wireless terminals to inform them that the one of the plurality of wireless terminals has activated the send all calls feature.

15. The method of claim 14 further comprises the step of each of the other ones of the plurality of wireless terminals rearranging the position of each in the call coverage group in response to the second message.

16. The method of claim 15 further comprises the steps of detecting an deactivation of the send all calls feature on the one of the plurality of wireless terminals; and transmitting a third message to the controlling one of the plurality of wireless terminals for each of the plurality of call coverage groups by the one of the plurality of wireless terminals to inform the controlling one of the plurality of wireless terminals that the one of the plurality of wireless terminals has deactivated the send all calls feature.

17. The method of claim 16 further comprises the step of transmitting a fourth message by the controlling one of the plurality of wireless terminals for each of the plurality of call coverage groups in response to the message to each of the other ones of the plurality of wireless terminals in the call coverage group controlled by the transmitting controlling one of the plurality of wireless terminals to inform them that the one of the plurality of wireless terminals has deactivated the send all calls feature.

18. The method of claim 17 further comprises the step of each of the other ones of the plurality of wireless terminals rearranging the position of each in the call coverage group in response to fourth message.

19. An apparatus for performing the method of claim 1.

20. An apparatus for performing the method of claim 4.

21. An apparatus for performing the method of claim 10.

22. An apparatus for performing the method of claim 13.

* * * * *